(12) United States Patent
Tompkin et al.

(10) Patent No.: US 11,472,216 B2
(45) Date of Patent: Oct. 18, 2022

(54) METHOD FOR PRODUCING SECURITY ELEMENTS, AND SECURITY ELEMENTS

(71) Applicant: OVD Kinegram AG, Zug (CH)

(72) Inventors: Wayne Robert Tompkin, Baden (CH); Andreas Schilling, Hagendorn (CH); Sebastian Mader, Baar (CH)

(73) Assignee: OVD Kinegram AG, Zug (CH)

( * ) Notice: Subject to any disclaimer, the term of this patent is extended or adjusted under 35 U.S.C. 154(b) by 368 days.

(21) Appl. No.: 16/740,879

(22) Filed: Jan. 13, 2020

(65) Prior Publication Data
US 2020/0215839 A1 Jul. 9, 2020

Related U.S. Application Data

(62) Division of application No. 15/541,181, filed as application No. PCT/EP2016/050092 on Jan. 5, 2016, now Pat. No. 10,583,680.

(30) Foreign Application Priority Data

Jan. 9, 2015 (DE) .......................... 102015100280.9

(51) Int. Cl.
*B42D 25/20* (2014.01)
*B42D 15/00* (2006.01)
(Continued)

(52) U.S. Cl.
CPC ............. *B42D 25/20* (2014.10); *B42D 15/00* (2013.01); *B42D 25/328* (2014.10); *B42D 25/40* (2014.10);
(Continued)

(58) Field of Classification Search
CPC ...... B42D 25/20; B42D 25/328; B42D 25/40; B42D 15/00; G07D 7/207; G01B 11/24; G02B 5/1861; G03H 1/0011
See application file for complete search history.

(56) References Cited

U.S. PATENT DOCUMENTS 5,032,003 A 7/1991 Antes
5,787,186 A 7/1998 Schroeder
(Continued)

FOREIGN PATENT DOCUMENTS

AU 2011348479 B2 6/2012
CN 1128006 7/1996
(Continued)

OTHER PUBLICATIONS

Chinese Office Action for corresponding Chinese Patent Application No. 201680005314.8, pp. 1-11 (dated Sep. 11, 2018).
(Continued)

*Primary Examiner* — Michael A Lyons
*Assistant Examiner* — Jarreas C Underwood
(74) *Attorney, Agent, or Firm* — Hoffmann & Baron, LLP

(57) ABSTRACT

A method for producing security elements, security elements, a security document with at least one security element as well as a transfer film with at least one security element, wherein a three-dimensional object is recorded and a surface profile of the three-dimensional object, described by a function F(x,y), is determined, wherein the function F(x,y) describes the distance between the surface profile and a two-dimensional reference surface spanned by co-ordinate axes x and y at the co-ordinate points x and y. A first microstructure is determined in such a way that the structure height of the first microstructure is limited to a predetermined value smaller than the maximum distance between the surface profile and the two-dimensional reference surface, and the first microstructure provides an observer with a first optical perception which corresponds to the surface profile of the three-dimensional object described by the function F(x,y).

9 Claims, 8 Drawing Sheets

(51) Int. Cl.
*B42D 25/328* (2014.01)
*B42D 25/40* (2014.01)
*G07D 7/207* (2016.01)
*G02B 5/18* (2006.01)
*G03H 1/00* (2006.01)
*G01B 11/24* (2006.01)

(52) U.S. Cl.
CPC ............ *G01B 11/24* (2013.01); *G02B 5/1861* (2013.01); *G03H 1/0011* (2013.01); *G07D 7/207* (2017.05)

(56) References Cited

U.S. PATENT DOCUMENTS

| | | | |
|---|---|---|---|
| 6,903,850 B2 * | 6/2005 | Kay | G03H 1/0236 359/2 |
| 7,256,897 B2 | 8/2007 | Sugiyama | |
| 7,265,904 B2 * | 9/2007 | Schilling | B42D 25/342 359/569 |
| 8,367,277 B2 | 2/2013 | Brehm et al. | |
| 8,625,181 B2 * | 1/2014 | Holmes | B42D 25/328 359/24 |
| 10,046,589 B2 * | 8/2018 | Lee | B42D 25/21 |
| 2006/0056065 A1 | 3/2006 | Schilling et al. | |
| 2006/0072225 A1 | 4/2006 | Schilling et al. | |
| 2006/0146385 A1 | 7/2006 | Paakkonen et al. | |
| 2006/0209412 A1 * | 9/2006 | Schilling | B42D 25/342 359/569 |
| 2007/0008595 A1 * | 1/2007 | Watanabe | G03H 1/08 359/2 |
| 2007/0211318 A1 * | 9/2007 | Miura | G03H 1/2286 359/2 |
| 2008/0258456 A1 | 10/2008 | Rahm et al. | |
| 2008/0259456 A1 | 10/2008 | Schilling et al. | |
| 2009/0061159 A1 | 3/2009 | Staub et al. | |
| 2009/0091834 A1 | 4/2009 | Ryzi et al. | |
| 2009/0162756 A1 | 6/2009 | Staub et al. | |
| 2011/0134496 A1 | 6/2011 | Tompkin et al. | |
| 2013/0052373 A1 | 2/2013 | Noizet et al. | |
| 2013/0063826 A1 | 3/2013 | Hoffmuller et al. | |
| 2013/0093172 A1 | 4/2013 | Fuhse et al. | |
| 2013/0099474 A1 | 4/2013 | Fuhse et al. | |
| 2013/0229697 A1 * | 9/2013 | Brown | B42D 25/328 359/2 |
| 2014/0037898 A1 | 2/2014 | Tompkin et al. | |
| 2014/0268261 A1 | 9/2014 | Kubo et al. | |
| 2014/0307321 A1 | 10/2014 | Schilling et al. | |
| 2014/0353959 A1 | 12/2014 | Lochbihler | |
| 2015/0084327 A1 * | 3/2015 | Souparis | B42D 25/328 427/7 |
| 2015/0258838 A1 | 9/2015 | Fuhse | |
| 2018/0015771 A1 | 1/2018 | Tompkin et al. | |

FOREIGN PATENT DOCUMENTS

| | | | |
|---|---|---|---|
| CN | 101416124 | 4/2009 | |
| CN | 103038674 | 4/2013 | |
| CN | 103648791 | 3/2014 | |
| CN | 104136944 | 11/2014 | |
| CN | 107107646 | 8/2017 | |
| DE | 102005027380 | 12/2006 | |
| DE | 102005061749 | 7/2007 | |
| DE | 102006037431 | 4/2008 | |
| DE | 102009056934 | 6/2011 | |
| DE | 102010025775 | 1/2012 | |
| DE | 102011014114 | 5/2012 | |
| DE | 102012020257 | 4/2014 | |
| EP | 0375833 | 7/1990 | |
| EP | 1562758 | 4/2006 | |
| EP | 1868822 A2 | 12/2007 | |
| EP | 2489524 A1 | 8/2012 | |
| JP | 2004233177 A | 8/2004 | |
| JP | 2007-025716 | 2/2007 | |
| JP | 2008547040 A | 12/2008 | |
| JP | 4-502822 | 7/2010 | |
| KR | 10-2005-0020771 A | 3/2005 | |
| WO | WO9008338 | 7/1990 | |
| WO | WO2004049250 | 6/2004 | |
| WO | WO-2007079851 A1 * | 7/2007 | ............ B42D 25/29 |
| WO | 2009/121602 | 10/2009 | |
| WO | WO2011044704 | 4/2011 | |
| WO | 2011138039 A1 | 11/2011 | |
| WO | WO-2012000669 A1 * | 1/2012 | ............ B42D 15/00 |
| WO | WO2013007374 | 1/2013 | |
| WO | WO2013084960 | 6/2013 | |
| WO | WO-2013084960 A1 * | 6/2013 | ............ B42D 25/00 |

OTHER PUBLICATIONS

Ostromoukhov et al., "Artistic Screening", Computer Graphics Proceedings, Annual Conference Series, pp. 219-228 (1995).
Chinese Office Action for corresponding Chinese Patent Application No. 201680005314.8, pp. 1-11 (dated May 20, 2019).
Lin Qi, "Research on TV News Audio-Visual Psychology."

* cited by examiner

METHOD FOR PRODUCING SECURITY ELEMENTS, AND SECURITY ELEMENTS

This application is a divisional application of U.S. application Ser. No. 15/541,181 filed Jun. 30, 2017, which claims priority based on an International Application filed under the Patent Cooperation Treaty, PCT/EP2016/050092, filed Jan. 5, 2016, which claims priority to DE102015100280.9, filed Jan. 9, 2015.

BACKGROUND OF THE INVENTION

The invention relates to a method for producing security elements, security elements, a security document with at least one security element, a transfer film with at least one security element as well as a laminating film with at least one security element.

Optically active security elements are used in particular on security documents such as for instance banknotes, passports, ID cards, check cards, credit cards, visas or certificates for both information and decorative purposes. Security elements of this type on the one hand increase protection against forgery for example vis-à-vis modern color copiers and other reproduction systems and on the other hand can be easily and clearly recognized by the layperson, with the result that the layperson can clearly determine the authenticity of a security document provided with a security element of this type and can thus recognize forgeries or manipulations.

For this purpose, security elements can have light-bending, diffractive structures such as for example holograms. Optical effects that are particularly striking and therefore memorable for the layperson are brought about, in particular, by representations having a spatial effect for an observer, which are produced, for example, by transmission holograms. However, holograms of this type have the disadvantage that the spatial representation of an object produced by them is heavily dependent on the illumination conditions and as a result of this they often have inadequate brilliance, in particular under illumination conditions which are not ideal, such as for example predominantly diffuse daylight. Thus, for sharp three-dimensional representation of an object, holograms of this type for example must be illuminated with a monochromatic point light source, such as for example a laser pointer. Furthermore, holograms of this type necessitate comparatively high equipment costs for the production of the master needed for a replication in corresponding layers. There is also, generally, no possibility of increasing the attractiveness of a corresponding optically variable element by additionally achieving particular color effects or color perceptions.

SUMMARY OF THE INVENTION

The object of the invention is now to provide a method for producing an optically variable security element as well as an optically variable security element such that an improved optical appearance having a three-dimensional effect is achieved by the optically variable security element.

This object is achieved by a method for producing a security element with the following steps: a) recording a three-dimensional object; b) determining a surface profile of the three-dimensional object described by a function F(x,y), wherein the function F(x,y) describes the distance between the surface profile and a two-dimensional reference surface spanned by co-ordinate axes x and y at the co-ordinate points x and y; c) determining a first microstructure in such a way that the structure height of the first microstructure is limited to a predetermined value smaller than the maximum distance between the surface profile and the two-dimensional reference surface and that the first microstructure provides an observer with a first optical perception which approximately corresponds to the surface profile of the three-dimensional object described by the function F(x,y); d) introducing the first microstructure into a layer of the security element, in particular by means of lithographic methods, in such a way that the first microstructure of the layer of the security element provides the observer with the first optical perception. This object is further achieved by a method for producing a security element, in particular according to one of claims 11 to 33, wherein, in one or more first zones, a first microstructure is produced, in particular by means of lithographic methods, wherein further the first microstructure is molded in such a way that the first microstructure provides an observer with a first optical perception which corresponds to a spatial perception of a first object, and wherein, in one or more second zones, a second microstructure is produced, in particular by registered exposure, wherein furthermore the second microstructure is molded in such a way that the second microstructure provides the observer with a second optical perception which corresponds to a multicolored representation of the first object, and wherein the first microstructure and the second microstructure are produced in such a way that the first optical perception of the first object and the second optical perception of the first object can be perceived by the observer at the same time. This object is also achieved by a security element for marking a security document, in particular a banknote, an identification document, a visa, a security or a credit card, wherein a layer of the security element comprises a first microstructure, wherein the first microstructure is molded in such a way that the structure height of the first microstructure is limited to a predetermined value smaller than the maximum distance between a surface profile of a three-dimensional object described by a function F(x,y) and a two-dimensional reference surface spanned by co-ordinate axes x and y, wherein the function F(x,y) describes the distance between the surface profile and the two-dimensional reference surface at the co-ordinate points x and y, and that the first microstructure provides an observer with a first optical perception which corresponds to the surface profile of the three-dimensional object described by the function F(x,y). This object is further achieved by a security element, wherein the security element has, in one or more first zones, a first microstructure, wherein the first microstructure is molded in such a way that the first microstructure provides an observer with a first optical perception which corresponds to a spatial perception of a first object, wherein the security element has, in one or more second zones, a second microstructure, wherein the second microstructure is molded in such a way that the second microstructure provides the observer with a second optical perception which corresponds to a multicolored representation of the first object, and wherein the first optical perception of the first object and the second optical perception of the first object can be perceived by the observer at the same time. This object is further achieved by a security document, in particular a banknote, an identification document, a visa, a security or a credit card, with at least one security element according to one of claims 10 to 33. This object is also achieved by a transfer film with at least one security element according to one of claims 10 to 33, wherein the at least one security element is detachably arranged on a carrier film of the transfer film. Furthermore, this object is also achieved by a laminating film with at least one security element according to one of claims 10 to 33, wherein the at least one security element is incorporated in the laminating film.

It has been shown here that security elements produced by means of a method of this type can be produced particularly cost-effectively and using large-scale industrial processes. It has further been shown that security elements of this type enable an optically variable effect to be generated which differs for the human observer from the optically variable effects that can be achieved using the methods named above according to the state of the art. Thus, an optically variable effect is produced by security elements of this type in such a way that the surface profile described by the function F(x,y) appears three-dimensional to an observer. In particular, the surface profile described by the function F(x,y) appears vis-à-vis the two-dimensional reference surface as if the surface profile were bulging out and/or set back, for example as if a domed surface were actually present. It is thus achieved by the first microstructure that the surface profile described by the function F(x,y) can be perceived by an observer as a protruding and/or set-back surface. It is thus possible to reproduce portraits, articles, motifs or other objects which appear three-dimensional. Particularly characteristic optical effects can thus be achieved which greatly increase the memorability and the protection against forgery of security elements of this type. Furthermore, optical variable effects brought about by security elements of this type appear more brilliant compared with effects which are brought about by holographically produced structures, since microstructures of this type can be produced with a high degree of accuracy. It has further been shown that particularly flat security elements can be produced with the method according to the invention, which produce a three-dimensional optical impression, i.e. a domed and in particular not a flat optical impression, for an observer. Security elements of this type further achieve the advantage that an observer is provided with a visually combined optical impression of a spatial, three-dimensional perception of a first object with, at the same time, a multicolored representation of the first object. The memorability, the recognition rate and the protection against forgery, in particular for laypeople, is hereby increased since particularly memorable and, in particular, optical effects having a particularly natural effect, can be achieved.

In the case of the perception for an observer which corresponds to the surface profile of the three-dimensional object described by the function F(x,y), the surface profile of the three-dimensional object described by the function F(x,y) appears vis-à-vis the two-dimensional reference surface as if the surface profile were bulging out and/or set back, i.e. as if a three-dimensionally domed surface were present. It is thus achieved by the first microstructure that the surface profile of the three-dimensional object described by the function F(x,y) can be perceived by an observer as a protruding and/or set-back surface. Thus, the diffractive optically active first microstructure, for example in the case of a correspondingly lens-like design, can produce a magnifying effect, a demagnifying effect and/or a distorting effect. Likewise, in the case of the spatial perception of a first object, the surface of the first object appears to an observer as if a correspondingly domed surface were present.

The distance between the surface profile of the three-dimensional object described by the function F(x,y) and a two-dimensional reference surface spanned by the co-ordinate axes x and y at the co-ordinate points x and y here describes the difference along a perpendicular to the reference surface spanned by the co-ordinate axes x and y between the surface profile of the three-dimensional object described by the function F(x,y) at the co-ordinate points x and y and the two-dimensional reference surface at the same co-ordinate points x and y. The distance is thus determined along the z-axis, which corresponds to the normal to the reference surface spanned by the co-ordinate axes x and y.

By two-dimensional reference surface is meant here a flat and/or a curved reference surface. It is thus possible for the two-dimensional reference surface to be molded flat or planar. It is further possible for the two-dimensional reference surface to be molded curved, for example in the shape of an arc of a circle. Furthermore, it is also possible for the two-dimensional reference surface to be flat in some areas and curved in some areas. Through a precompensation, which takes into consideration a curved surface to which the security element is to be applied, it is possible to apply the security element to the curved surface, in particular of a domed substrate, wherein the first optical perception and/or the second optical perception are represented optically undistorted similar to a corresponding security element on a flat surface, in particular a planar substrate.

Depending on the design of the second microstructure, it is possible for the second optical perception of the first object to be perceptible to the observer at the same time as the first optical perception of the first object, depending on the viewing conditions. If the second optical microstructure is thus a true color hologram, for example, the observer's perception of it is dependent on the viewing conditions.

By the term viewing conditions is meant here both the viewing angle at which the security element is viewed by an observer and the angle at which the security element is illuminated by an illumination device. By the term viewing conditions is further also meant the illumination conditions, such as for example diffuse daylight or a point light source. By viewing angle is meant the angle enclosed between the surface normal of the plane spanned by the underside of the security element and the viewing direction of an observer. Likewise, by viewing angle is meant the angle enclosed between the surface normal of the plane spanned by the underside of the security element and the illumination direction of an illumination device. Thus, for example, at the viewing angle of 0° an observer looks at the surface of the security element perpendicularly, and at a viewing angle of 70° an observer looks at the security element at a shallow angle. If the viewing direction of the observer and/or the illumination direction of the illumination device and/or the illumination conditions change, the viewing conditions consequently change.

Further advantageous embodiments of the invention are described in the dependent claims.

The proportion of the one or more first zones in the total surface area consisting of the one or more first zones and the one or more second zones is preferably between 10% and 90%, preferably between 30% and 70% and further preferably between 45% and 55%. It is hereby possible to weight the first optical perception and the second optical perception for the observer appropriately. It has thus been shown that a proportion of the one or more first zones in the total surface area consisting of the one or more first zones and the one or more second zones of in each case 50% results, for an observer, in particularly memorable combination effects of the first optical perception and of the second optical perception.

According to a further preferred embodiment example of the invention, the first microstructure is molded in a layer of the security element in such a way that the structure height of the first microstructure is limited to a predetermined value smaller than the maximum distance between a surface profile of a three-dimensional object described by a function $F(x,y)$ and a two-dimensional reference surface spanned by co-ordinate axes x and y, wherein the function $F(x,y)$ describes the distance between the surface profile and the two-dimensional reference surface at the co-ordinate points x and y, and that the first optical perception provided to the observer by the first microstructure corresponds to the surface profile of the three-dimensional object described by the function $F(x,y)$.

The surface profile described by the function $F(x,y)$ preferably comprises one or more alphanumeric characters, geometric figures, portraits and/or other objects or motifs.

The first microstructure is advantageously molded in such a way that the first microstructure brings about a deflection of incident light in the same directions as those in which the surface profile described by the function $F(x,y)$ deflects incident light. It is hereby achieved that the observer is provided with a first optical perception which corresponds, or at least approximately corresponds, to the surface profile of the three-dimensional object described by the function $F(x,y)$. The observer's perception can thus be approximated to the natural impression of a three-dimensional object.

It is further possible for the function $F(x,y)$ to be a function that is continuous in some areas and differentiable in some areas.

In the method for producing a security element it has proved successful if the step a) of recording the three-dimensional object comprises the generation of a virtual three-dimensional object and/or the recording of a real three-dimensional object by means of a recording device, in particular a contact profilometer and/or a laser scanner. The recording of the three-dimensional object thus comprises both the generation and the freeform designing of a virtual three-dimensional object without a template or also, for example, starting from photographs of the three-dimensional object as a template and the recording of a real three-dimensional object by means of a recording device. One or more photographs of the three-dimensional object are preferably used as template for the generation of the virtual three-dimensional object. It is advantageous here if the one or more photographs are taken from different perspectives in order subsequently to be able to generate as exact as possible a reproduction of the three-dimensional object through the virtual three-dimensional object. However, it is also possible for the virtual three-dimensional object to be generated starting from only one photograph. Virtual three-dimensional objects of this type are produced, for example, by computer graphics which are based on polygon meshes, wire-frame models or voxels. Suitable software for generating a virtual three-dimensional object is, for example, the ZBrush or Sculptris software from Pixologic, California, USA. It is also possible to record real three-dimensional objects by means of a recording device, in particular a contact profilometer and/or a laser scanner. Thus, for example, a coin can be recorded as a real three-dimensional object by means of a recording device. A contact profilometer scans the surface of the three-dimensional object by means of a stylus, for example. From the measurement data obtained in this way, a virtual three-dimensional object is generated. A laser scanner likewise generates a virtual three-dimensional object through point-by-point scanning of the surface of the three-dimensional object with a laser beam, the focus of which is varied with each scanned point. In contrast to the contact profilometer, a laser scanner is a non-contact optical recording device. It is further possible to use further non-contact optical recording devices which are based, for example, on the confocal technique or on white light interferometry, for the recording of the three-dimensional object.

It is further possible for real three-dimensional objects, such as for example known buildings or sculptural, three-dimensional images, such as e.g. busts of known persons, to be recorded, which are very memorable for an observer. It is also possible to generate virtual three-dimensional objects which do not occur as real three-dimensional objects. Thus, for example, three-dimensional figures which are actually impossible, such as for example an impossible staircase, can also be generated virtually.

The spatial resolution of the recording device preferably corresponds to at least 1.5 times, preferably 2 times, further preferably 2.5 times the smallest structure to be represented of the surface profile of the three-dimensional object described by the function $F(x,y)$. It is hereby achieved that all of the details of the three-dimensional object are correspondingly reproduced in the first microstructure and the observer thus perceives all of the details of the three-dimensional object in the first optical perception, which corresponds to the surface profile of the three-dimensional object described by the function $F(x,y)$.

A microstructure with a binary surface relief, a multi-step surface relief and/or a continuous surface relief is advantageously determined as first microstructure in step c).

Further, it is advantageous if the first microstructure has a binary surface relief, a multi-step surface relief or a continuous surface relief. Thus, sinusoidal grating structures can be used, for example, as continuous surface relief. Further, it is possible for the first microstructure to be regular or to be varied statistically, in particular randomly and/or pseudo-randomly, in one or more structural parameters. It is also possible for the first microstructure to be a combination of one of the above-named microstructures with an isotropic or anisotropic mat structure. Such a combination can be, for example, an additive or subtractive superimposition of the first microstructure with an isotropic or anisotropic mat structure.

The structure height of the first microstructure is preferably chosen substantially constant over the entire surface of the first microstructure for the formation of a binary surface relief and further the width of the grating grooves and/or of the grating bars of the binary surface relief of the first microstructure is chosen such that the observer is provided with the first optical perception. The binary surface relief has substantially rectangular grating grooves and grating bars, with the result that the diffraction of the light in different directions is achieved in that the width of the grating grooves and/or of the grating bars of the binary surface relief is varied accordingly. Binary surface reliefs of this type can be produced using corresponding masks, which results, on the one hand, in a very high degree of accuracy of the first microstructures with a binary surface relief produced and, on the other hand, in comparatively low production costs. Through the high degree of accuracy of the first microstructures produced in this way, a good brilliance of the optically variable effect produced by the first microstructure is in turn achieved.

It is also possible, for the formation of a continuous surface relief, for the first microstructure to be designed in such a way that one side in each case of the grating grooves of the continuous surface relief of the first microstructure run parallel to each other and substantially parallel to the one perpendicular to the two-dimensional reference surface, that the other sides in each case of the grating grooves run parallel to the surface profile of the three-dimensional object described by the function F(x,y) at least in areas and/or that, for the formation of the continuous surface relief of the first microstructure, the first microstructure is designed in such a way that the first microstructure is equal to the result of the surface profile described by the function F(x,y) modulo the predetermined value of the structure height of the first microstructure. By continuous surface relief is thus meant a surface relief which is continuous at least in areas. The continuous surface relief thus has a continuous profile between one side in each case of the grating grooves which run parallel to each other and substantially parallel to a perpendicular to the two-dimensional reference surface. Surface reliefs of this type are preferably produced by way of so-called "direct writing" by means of laser or electron beam lithography machines. This method is also called gray-tone lithography. Machines and methods of this type allow a quite particular surface relief to be produced which provides the observer with the sought optical effect in the form of the first optical perception, which corresponds to the surface profile of the three-dimensional object described by the function F(x,y). Further, surface reliefs of this type can be produced by means of holographic methods, or also with specialized gray-tone mask methods.

It is further possible for the other sides in each case of the grating grooves running at least in areas parallel to the surface profile of the three-dimensional object described by the function F(x,y) to be approximated in steps in such a way that the height of the stepped approximations is constant between predetermined co-ordinate points x and y of the two-dimensional reference surface and corresponds to the value at the respective co-ordinate points x and y of the first microstructure with the continuous surface relief. Hereby, a multi-step surface relief is produced which provides the observer with the first optical perception. Advantageously, the sides of the stepped approximation run substantially parallel to the perpendicular to the two-dimensional reference surface. The predetermined co-ordinate points x and y preferably form a two-dimensional grid, wherein the stepped approximation is carried out in each case in a grid area of the two-dimensional grid. The smaller the grid areas of the two-dimensional grid, i.e. the higher the resolution of the two-dimensional grid, the better the first microstructure with the continuous surface relief is approximated in steps.

It is further advantageous if, in step d), the introduction of the first microstructure into the layer of the security element is effected by means of electron beam lithography and/or photolithography. This makes it possible to produce first microstructures with surface reliefs, in particular binary surface reliefs, multi-step surface reliefs and/or continuous surface reliefs, which provide the observer with the desired first optical perception, which corresponds to the surface profile of the three-dimensional object described by the function F(x,y).

It is further possible for the method for producing a security element further to comprise the following steps:
determining at least two separate color separations of the first object, in particular of the three-dimensional object and/or of the surface profile of the three-dimensional object described by the function F(x,y) and/or of a two-dimensional representation of the three-dimensional object, wherein each of the at least two separate color separations of the first object, in particular of the three-dimensional object and/or of the surface profile of the three-dimensional object described by the function F(x,y) and/or of a two-dimensional representation of the three-dimensional object corresponds to a different primary color of a color space, in particular of the RGB color space;
generating at least two separate grid masks for the at least two separate color separations in such a way that the at least two separate grid masks differ in the grid parameters, in particular grid width and/or grid angle, and wherein the grid parameters, in particular grid width and/or grid angle, correspond to a different primary color of a color space, in particular of the RGB color space;
exposing a photoresist plate in such a way that the photoresist plate is exposed in a registered manner by means of the at least two separate grid masks;
developing the photoresist plate.

It further possible for the exposure of the photoresist plate to be effected by means of a grating exposure or slit exposure and using one or more intermediate masters. This makes it possible to reduce the dependence of the multicolored representation of the first object with respect to changes in the viewing and/or illumination angle. This reduction of the dependence of the multicolored representation of the first object with respect to changes in the viewing and/or illumination angle leads, however, to slight losses in the brightness of the first object.

It is further possible for the method for producing a security element further to comprise the following steps:
producing an embossing die by means of the developed photoresist plate.

It is further advantageous that the method for producing a security element further comprises the following steps:
introducing a second microstructure into the layer of the security element, in particular in one or more second zones of the security element, in such a way that the second microstructure provides the observer with a second optical perception, which corresponds to a multicolored representation of the first object, in particular of the three-dimensional object and/or of the surface profile of the three-dimensional object described by the function F(x,y) and/or of a two-dimensional representation of the three-dimensional object.

It is further possible to introduce the second microstructure into the layer of the security element by way of so-called "direct writing" by means of laser or electron beam lithography machines. It is hereby possible to produce the microstructure with the highest quality and the finest resolutions up to the nanometer range.

According to a further preferred embodiment example of the invention, the multicolored representation of the first object comprises at least two different primary colors of a color space, in particular of the RGB color space. Interesting and thus memorable optical effects can hereby be produced for the observer, wherein through the use of at least two different primary colors of the color color space mixed colors are produced for the observer from the at least two different primary colors of the color space.

It is further advantageous for the different primary colors to lie in the range of the wavelengths visible to the human eye, in particular in the wavelength range from 380 nm to 780 nm.

It is also possible for the second microstructure to be a true color hologram and/or a Kinegram®.

It is further advantageous if the layer of the security element comprising the first microstructure comprises a reflective layer, in particular a metal layer and/or an HRI or LRI layer (HRI—high refractive index, LRI—low refractive index), it is preferably a multilayer system with several reflective layers arranged next to each other and/or over each other, for example metal layers and/or HRI layers or alternating HRI and LRI layers.

It is thus possible for the reflective layer to be molded as a metal layer made of chromium, aluminum, gold, copper, silver or an alloy of such metals. The metal layer is preferably vapor-deposited in a vacuum in a layer thickness of from 10 nm to 150 nm.

Furthermore, it is also possible for the reflective layer to be formed by a transparent reflective layer, preferably a thin or finely-structured metallic layer or a dielectric HRI or LRI layer. Such a dielectric reflective layer consists, for example, of a vapor-deposited layer made of a metal oxide, metal sulfide, e.g. titanium oxide or ZnS etc. with a thickness of from 10 nm to 150 nm.

It is further possible for the reflective layer to be molded in areas. It is hereby achieved, for example, that further security features which lie underneath the reflective layer are furthermore visible to an observer. It is also possible for the reflective layer to be designed patterned, in particular to represent an item of information. A pattern can, for example, be a graphically formed outline, a figurative representation, a grid, an image, a motif, a symbol, a logo, a portrait, an alphanumeric character, a text and the like. It is hereby possible to further increase the protection against forgery.

According to a further preferred embodiment example of the invention, the one or more first zones and the one or more second zones are arranged according to a grid.

It is further possible for the grid widths to be smaller than the resolution limit of the naked human eye, in particular for the grid widths to be smaller than 300 µm, preferably smaller than 200 µm.

The grid is preferably a one-dimensional grid, spanned by the x- or the y-axis, in particular a line grid.

It is also possible for the one-dimensional grid to be formed in the shape of sinuous lines or wavy lines.

It is further advantageous when the grid is a two-dimensional grid, spanned by the x- and the y-axis, in particular a dot grid.

Advantageously, the grid is a periodic grid.

The one or more first zones and the one or more second zones are preferably gridded into each other.

It is further advantageous if in each case a first zone of the one or more first zones is arranged adjacent to a second zone of the one or more second zones and the one or more first zones are arranged alternating with the one or more second zones.

It is thus possible for the arrangement of the one or more first zones and of the one or more second zones to be effected according to a grid by means of so-called interlacing, with the result that the one or more first zones and the one or more second zones are gridded into each other, i.e. in each case one first zone and one second zone are adjacent to each other and in each case alternating. It is thus possible, through interlacing of the two high-resolution first and second zones, the grid width of which is in particular in each case below the resolution capacity of the naked human eye, for the optical effects of both first and second zones to be accordingly perceived at the same time and combined. If, in the one or more first zones, the first microstructure thus represents, for example, an object or motif with a three-dimensional effect and, in the one or more second zones, the second microstructure represents a true color representation of the same object or motif of the first microstructure in the first zones, e.g. as a true color hologram, then a spatial or three-dimensional impression in true colors can thus be achieved in a particularly advantageous manner in this combination. This combination is so closely approximated to the natural impression of a real sculptural reproduction of the object or motif that a human observer can perceive the optical effect as very realistic.

Preferably, at least one of the parameters azimuthal angle, grating period or grating depth of the first microstructure is varied pseudo-randomly within a predefined variation range. It is thus possible, for the pseudo-random variation of one or more of the parameters azimuthal angle, grating period or grating depth of the first microstructure within an in each case predefined variation range, for a parameter variation value to be selected from a predefined group of parameter variation values. The predefined group preferably comprises between 3 and 30, further preferably between 3 and 10 parameter variation values. The pseudo-random variation thus is not effected in the sense of a purely random process which can adopt all possible parameters within the variation range, but has a limited number of possibilities.

It is further advantageous if the parameter azimuthal angle of the first microstructure varies pseudo-randomly in a variation range from −180° to +180°.

The difference between the maximum grating depth of the first microstructure and the minimum grating depth of the first microstructure, between which the grating depth varies pseudo-randomly, is advantageously between 0.1 µm and 10 µm, preferably between 0.25 µm and 2.5 µm.

It is also possible for the grid width of the one-dimensional grid to vary in the direction of the x-axis or of the y-axis, in particular within a predefined variation range.

It is further possible for the grid to be a non-periodic grid, in particular wherein the grid width is varied within a predefined variation range.

It is thus advantageous if the grid width is varied in the direction of the co-ordinate axis x and/or in the direction of the co-ordinate axis y in a range between 50% and 150%, in particular between 80% and 120%, of the average grid width in the direction of the co-ordinate axis x and/or in the direction of the co-ordinate axis y.

It is further possible for the grid width to vary in the direction of the co-ordinate axis x and/or in the direction of the co-ordinate axis y by at least 1%, in particular by at least 10% between two successive grid points.

It can further be provided that one or more third zones of the layer of the security element has a third microstructure, in particular a diffractive relief structure selected from the group Kinegram® or hologram, zero-order diffraction structure, blazed grating, in particular asymmetrical saw-tooth relief structure, diffraction structure, in particular linear sinusoidal diffraction grating, or crossed sinusoidal diffraction grating or linear single- or multi-step rectangular grating, or crossed single- or multi-step rectangular grating, light-diffracting and/or light-refracting and/or light-focusing micro- or nanostructure, binary or continuous Fresnel lens, binary or continuous Fresnel freeform surface, diffractive or refractive macrostructure, in particular lens structure or microprism structure, mirror surface, mat structure, in particular anisotropic or isotropic mat structure, or combinations of these structures.

The security document can be, for example, a banknote, security, stock, credit card, bank card, cash card, loyalty card, ticket or an ID document such as an identity card, visa, driver's license, in particular a chip card or a passport.

BRIEF DESCRIPTION OF THE DRAWINGS

Embodiment examples of the invention are explained below by way of example with the aid of the accompanying figures which are not drawn to scale.

DETAILED DESCRIPTION OF THE PREFERRED EMBODIMENTS

Figure 1A:
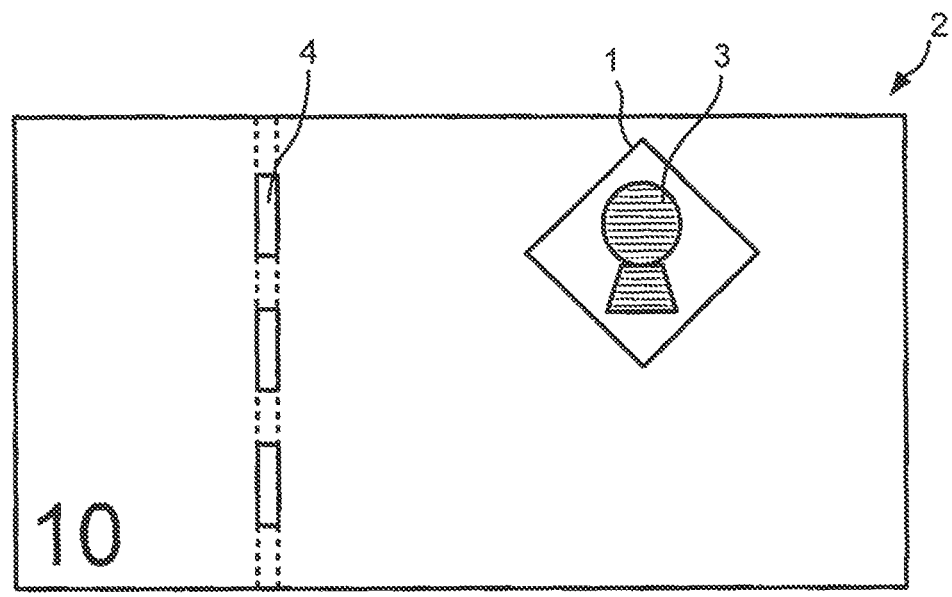
FIG. 1a shows a schematic top view of a security document with a security element

FIG. 1a shows a security element 1 on a security document 2. The security document 2 is preferably a banknote, an identification document, a visa, a security or a credit card. The security document 2 can have further security elements, such as for example a security thread 4 or (not shown individually here) a security print, a security element applied as a film element (transfer film or laminating film). The security element 1 can overlap the further security elements and/or be arranged adjacent thereto.

The security element 1 can be applied to the security document e.g. by means of an adhesive layer. The security element 1 can have been applied to the security document 2 as a transfer ply of a transfer film in particular by means of hot-embossing or cold-embossing. The security element 1 can alternatively thereto also be applied as a tag or label.

As shown in FIG. 1a, the security element 1 has a geometric FIG. 3, which appears three-dimensional to an observer. However, it is also possible for the the security element 1 to have alphanumeric characters, portraits and/or other objects, which likewise appear three-dimensional or domed upwards or downwards to an observer.

Figure 1B:
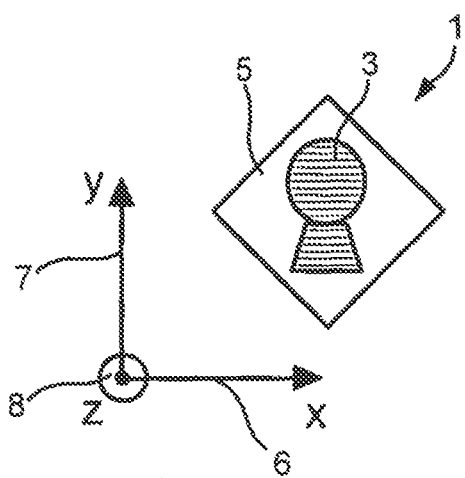
FIG. 1b shows a schematic top view of the security element according to FIG. 1a FIG. 2a to FIG. 2f show schematically method steps for producing a security element

As shown in FIG. 1b, a two-dimensional reference surface 5 spanned by the x-co-ordinate axis 6 and the y-co-ordinate axis 7 is defined, as well as further a z-axis 8 perpendicular to the two-dimensional reference surface 5. FIG. 1b thus illustrates by way of example a three-dimensional co-ordinate system spanned by the co-ordinate axes x, y and z, which defines the spatial directions 6, 7 and 8.

The security element 1 has a layer which comprises a microstructure. The layer is preferably a varnish layer with a layer thickness between 1 μm and 100 μm.

The microstructure is molded in such a way that the microstructure provides an observer with a spatial optical perception of the geometric FIG. 3.

FIG. 2a to FIG. 2f show schematically method steps for producing a security element 1.

Figures 2A, 2B, 2C:
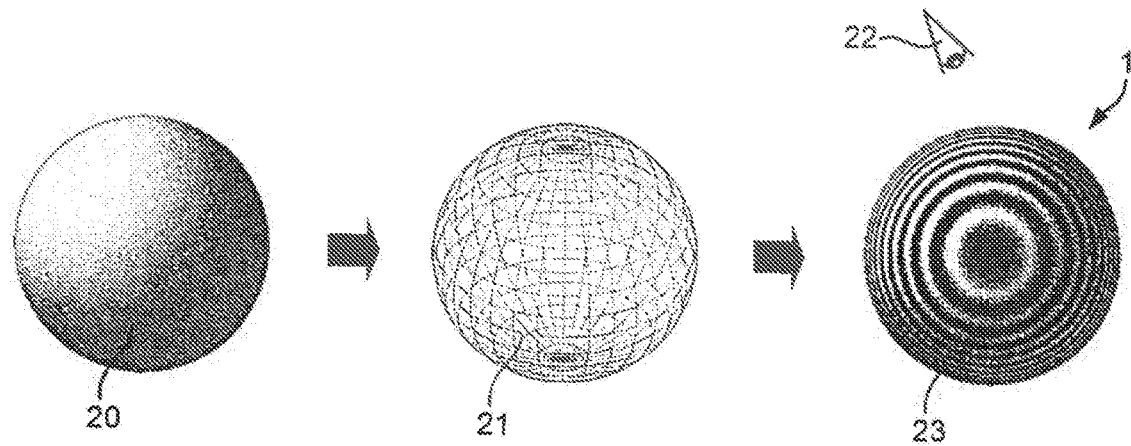

Thus, FIG. 2a to FIG. 2c show method steps for producing a security element 1 starting from a two-dimensional image 20 which is shown schematically in FIG. 2a. The image 20 here shows an illustration of an object having a three-dimensional effect. This artistic illustration or drawing is itself two-dimensional and only brings about a three-dimensional optical impression through its artistic form or design.

In a first step, starting from the two-dimensional image 20, a virtual three-dimensional object 21 is generated, as shown in FIG. 2b. Virtual three-dimensional objects 21 of this type are produced, for example, by computer graphics which are based on polygon meshes, wire-frame models or voxels. Suitable software for generating a virtual three-dimensional object 21 is, for example, the ZBrush or Sculptris software from Pixologic, California, USA. It is also possible to generate virtual three-dimensional objects which do not occur as real three-dimensional objects. For example, three-dimensional figures which are actually impossible, such as for example an impossible staircase, can also be generated virtually. For virtual three-dimensional objects of this type no two-dimensional image is thus necessary as template, with the result that virtual three-dimensional objects of this type are generated purely by means of computer graphics.

It is also possible for real three-dimensional objects to be recorded by means of a recording device, in particular a contact profilometer and/or a laser scanner. Thus, for example, a coin can be recorded as a real three-dimensional object by means of a recording device. A contact profilometer scans the surface of the three-dimensional object by means of a stylus, for example. From the measurement data obtained in this way, a virtual three-dimensional object is generated. A laser scanner likewise generates a virtual three-dimensional object through point-by-point scanning of the surface of the three-dimensional object with a laser beam, the focus of which is varied with each scanned point. In contrast to the contact profilometer, a laser scanner is a non-contact optical recording device. It is further possible to use further non-contact optical recording devices which are based, for example, on the confocal technique or on white light interferometry, for the recording of the three-dimensional object. Furthermore, it is also possible for real three-dimensional objects to be recorded by means of a strip projection or triangulation method. With recording devices of this type, it is possible to record very large objects, in particular buildings, cars or topographies, such as for example mountains. The spatial resolution of the recording device preferably corresponds to at least 1.5 times, preferably 2 times, further preferably 2.5 times the smallest structure to be represented of the real three-dimensional object. It is further possible for real three-dimensional objects, such as for example known buildings or busts of known persons, to be recorded, which are very memorable for an observer.

In a further step, a surface profile of the three-dimensional object 21 described by a function F(x,y) is determined, wherein the function F(x,y) describes the distance between the surface profile and a two-dimensional reference surface spanned by the co-ordinate axes x and y at the co-ordinate points x and y. For this purpose, the three-dimensional surface profile is projected point by point onto the two-dimensional reference surface, for example, and the corresponding distance is calculated geometrically for each point of the reference surface relative to the chosen reference surface. By this means, a surface profile described by the function F(x,y) forms, for example in the shape of a point cloud, which encodes the height information of the three-dimensional object. A large number of points, in particular between 10 and 100 million points, is preferably used and thus a correspondingly precise scanning of the surface of the three-dimensional object. The projection is preferably effected by means of suitable projection algorithms. Furthermore, the two-dimensional reference surface can be flat and/or curved.

In a further step, a microstructure is determined in such a way that the structure height of the microstructure is limited to a predetermined value smaller than the maximum distance between the surface profile and the two-dimensional reference surface, and that the microstructure provides an observer 22 with a first optical perception which corresponds to the surface profile of the three-dimensional object 21 described by the function F(x,y). Thus, starting from the surface profile of the three-dimensional object 21 described by the function F(x,y), the microstructure is calculated, for example by means of a mathematical modulo operation, wherein the structure height of the microstructure is previously limited to a maximum permissible value. The microstructure is then equal to the result of the surface profile described by the function F(x,y) modulo the predetermined value of the structure height of the microstructure. The maximum permissible value of the structure height or the structure height itself is here preferably determined on the basis of boundary conditions, such as for example a maximum possible structure height or a maximization of the diffraction efficiency for a particular wavelength.

In a last step, the microstructure is introduced into a layer of the security element 1, in particular by means of lithographic methods, in such a way that the microstructure provides the observer 22 with the optical perception 23 which corresponds to the surface profile of the three-dimensional object 21 described by the function F(x,y), as shown in FIG. 2c. FIG. 2c shows, in a very simplified manner and schematically, a possible the optical perception 23 which is produced by the microstructure of the layer of the security element 1. However, with the microstructure, a considerably more realistic 3D effect can also be achieved than would be possible with the artistic illustration of FIG. 2a. As far as the basic optical impression is concerned, a three-dimensional object or motif similar to that shown in FIG. 2a can also be produced with the microstructure producing the optical perception 23 of FIG. 2c, wherein only the motif is similar but the three-dimensional optical effect is reproduced in an intensified and more realistic manner. The microstructure can be introduced into the layer of the security element 1, for example, by means of established lithographic methods such as electron beam lithography, laser beam lithography, Kinemax, holography and/or mask-lighting processes.

Figures 2D, 2E, 2F:
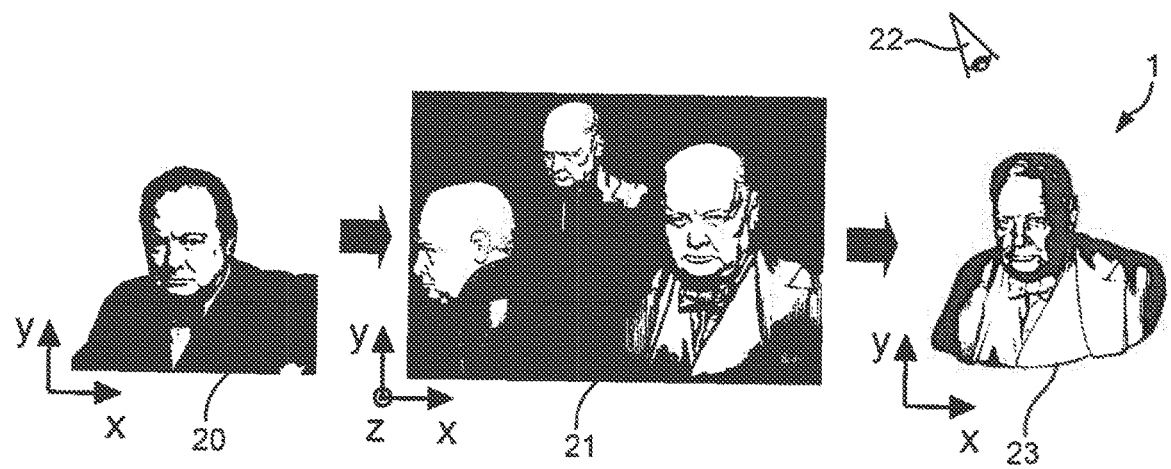

FIG. 2d to FIG. 2f show method steps for producing a security element 1 starting from a two-dimensional image 20 which is shown in FIG. 2d and represents a portrait in the form of a photograph. FIG. 2e shows three perspective views of a virtual three-dimensional object 21 which is produced by computer graphics. FIG. 2f shows the optical perception 23 of the security element 1 provided to an observer. With respect to the method steps for producing the security element 1 in FIG. 2d to FIG. 2f, reference is made to the above statements.

Figure 3A:
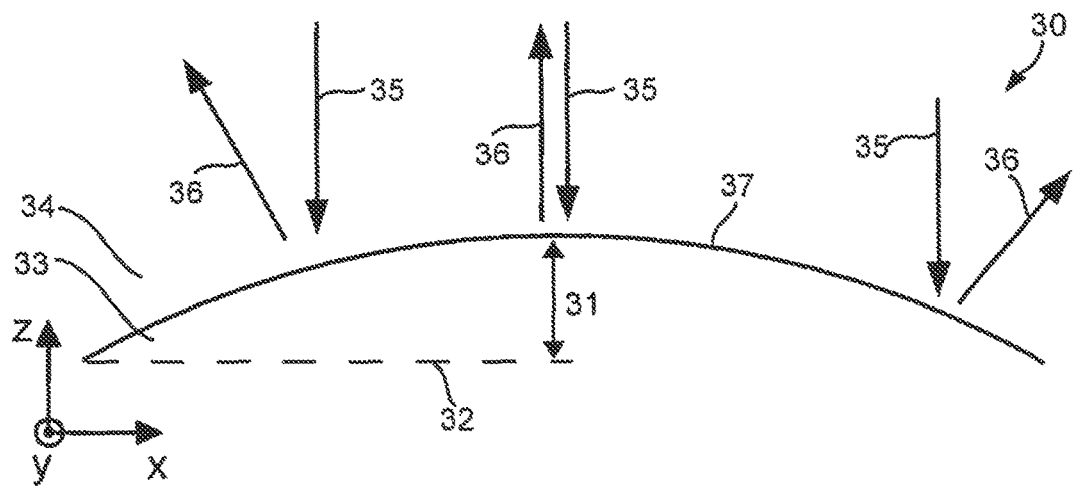
FIG. 3a to FIG. 3c show schematic sectional representations
Figure 3B:
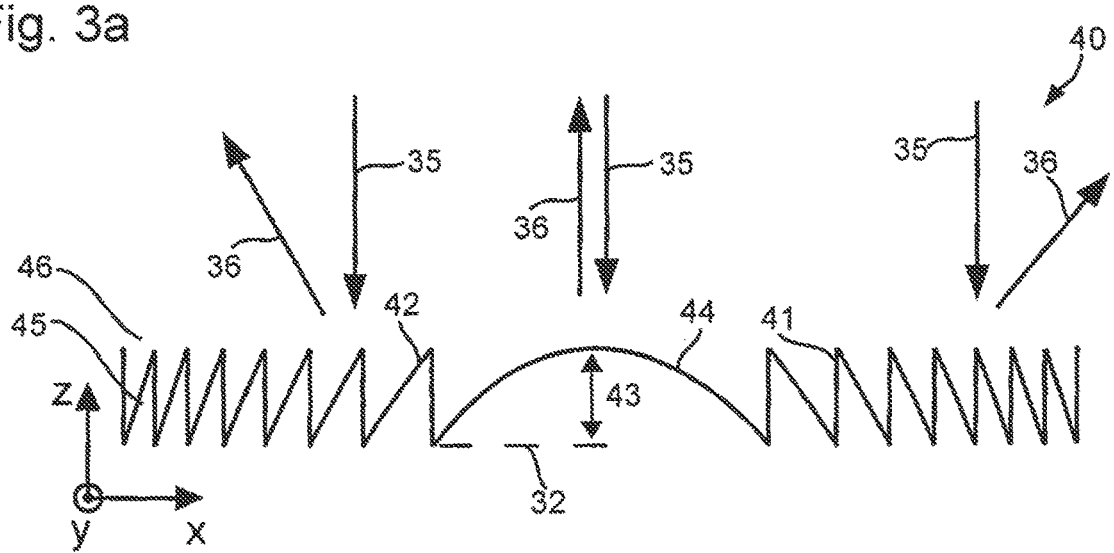
Figure 3C:
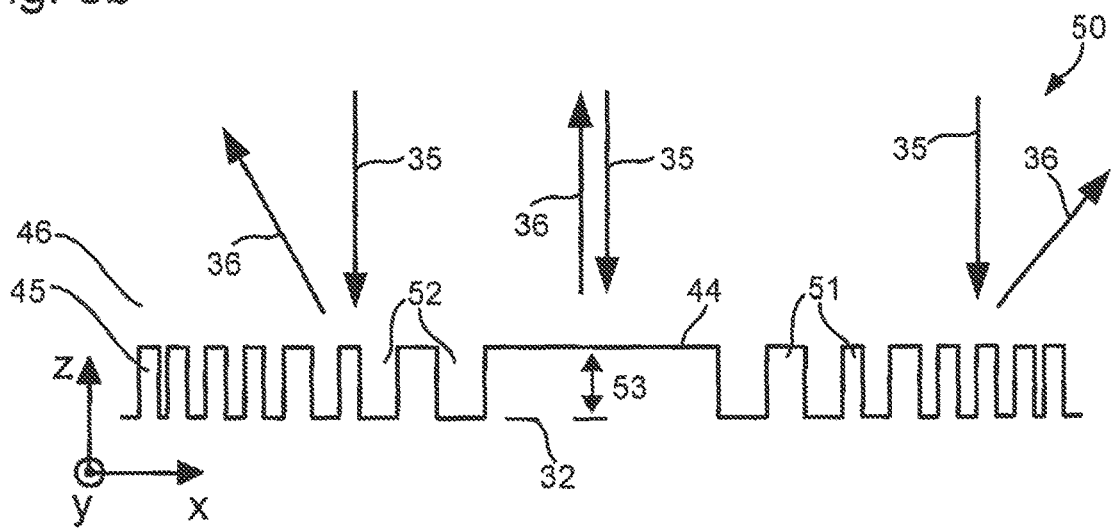

FIG. 3a to FIG. 3c show schematic sectional representations. Thus, FIG. 3a shows a sectional representation of a simple spherical profile 30. This spherical profile 30 was chosen in order to be able to explain the relationships in a particularly simple example in the following. Of course, in the case of considerably more complex surface profiles, for example a portrait, a symbol or an artistically designed relief, such as for example a coat of arms, the resulting microstructures also have a correspondingly greater complexity, in order to be able to produce the desired optical effect. The spherical profile 30 of FIG. 3a represents a surface profile 37 of a three-dimensional object described by the function F(x,y), for example a detail of the three-dimensional object 21 of FIG. 2b. The x-, y- and z-axes are shown here without units since a precise value is not important. For example, the x- and y-axes can be specified in the unit mm and the z-axis can be specified in the unit radian. For example, the diameter of the spherical profile 30 can thus be between 0.15 mm and 300 mm. The spherical profile 30 has a maximum structure height 31 which runs parallel to the co-ordinate axis z. The structure height 31 of the spherical profile 30 is 50 in FIG. 3a, wherein the value is the phase difference in radians. When the wavelength of the incident light 35 is known, the geometric height can be calculated from the phase difference (also taking into consideration the refractive indices of the material layers 33, 34). The co-ordinate axis z is the normal to the reference surface 32 spanned by the co-ordinate axes x and y. The maximum structure height 31 thus corresponds to the maximum distance between the surface profile 37 of the three-dimensional object described by the function F(x,y) and the reference surface 32. The spherical profile 30 now deflects incident light 35 according to its geometric design in the directions 36. The deflection of the incident light 35 further depends on refractive indices of the material layers 33, 34 of the three-dimensional object and on the wavelength of the incident light 35. The surface profile 37 described by the function F(x,y) thus forms an optical boundary surface between the material layers 33, 34 of the three-dimensional object. One of the material layers 33, 34 of the three-dimensional object can be formed by air.

FIG. 3b now shows a microstructure with a continuous surface relief 40. The microstructure with the continuous surface relief 40 is now molded in such a way that it deflects incident light 35 in the same directions 36 as the surface profile 37 described by the function F(x,y) of FIG. 3a. Here, in addition to the surface profile 37 described by the function F(x,y), the material layers 33, 34 of the three-dimensional object as well as the wavelength of the incident light 35 were taken into consideration, with the result that the deflection of the incident light is effected substantially in the same directions 36 as in FIG. 3a. As shown in FIG. 3b, the structure height 43 of the microstructure with the continuous surface relief 40 is smaller than the maximum structure height 31 of the spherical profile 30 in FIG. 3a. The structure height 43 in FIG. 3b is 6, wherein the value is the phase difference in radians, as in FIG. 3a. The structure height 43 is preferably at least 10 times smaller than the maximum structure height 31 of the spherical profile 30. The sides 41 of the grating grooves of the continuous surface relief of the microstructure 44 run parallel to each other and substantially parallel to the perpendicular to the two-dimensional reference surface 32. The other sides 42 in each case of the grating grooves run parallel to the surface profile 37 described by the function F(x,y) at least in areas. The microstructure 44 is preferably determined by the result from the surface profile 37 described by the function F(x,y) modulo the predetermined value of the structure height 43 of the microstructure 44. Because of the mathematical modulo operation, the sides 41 of the grating grooves of the continuous surface relief 40 of the microstructure 44 form. The sides 42 have a continuous profile.

It is further possible for the sides 42 to be approximated in steps in such a way that the height of the stepped approximations is constant between predetermined co-ordinate points x and y of the two-dimensional reference surface 32 and corresponds to the value at the respective co-ordinate points x and y of the microstructure with the continuous surface relief 40. A microstructure with a multi-step surface relief is thus produced. Advantageously, the sides of the stepped approximation run substantially parallel to the perpendicular to the two-dimensional reference surface 32. The predetermined co-ordinate points x and y preferably form a two-dimensional grid, wherein the stepped approximation is carried out in each case in a grid area of the two-dimensional grid. The smaller the grid areas of the two-dimensional grid, i.e. the higher the resolution of the grid, the better the microstructure with the continuous surface relief 40 is approximated in steps.

The microstructure 44 is preferably introduced into one of the layers 45, 46. The layers 45, 46 are preferably varnish layers. The layers 45, 46 are, in particular, formed from a thermoplastic varnish (e.g. from PVC, polyester or thermoplastic acrylates) or UV-curing varnish (e.g. from an acrylate crosslinking with isocyanate (NCO)). The varnish layer 46 facing the observer is preferably transparent or translucent. The layers 45, 46 can also have the same or different colors. It is thus possible, for example, for the layer 45 to be colored green and the layer 46 to be colored red. It is further possible for one of the layers 45, 46 to be implemented as an adhesive layer. It is also advantageous if the refractive index of the layers 45, 46 differs by at least 0.2, in order to form an optical boundary layer and thus to make the microstructure 44 visible, and/or if a reflection-increasing coating, in particular made of metal and/or HRI material, is arranged directly on the microstructure 44 between the layers 45, 46.

The microstructure 44 with the continuous surface relief 40 is preferably produced by means of so-called "direct writing", i.e. a method in which either the material is removed by means of a laser according to the desired relief or a photoresist or electron-beam resist is exposed by means of a laser or an electron beam lithography machine according to the desired relief and the desired relief or its negative is subsequently obtained by developing the photoresist. "Direct writing" thus enables, in particular, the production of continuous surface reliefs of the microstructure 44 according to FIG. 3b.

It is further advantageous if the layer comprising the microstructure 44 comprises a reflective layer, in particular a metal layer and/or an HRI or LRI layer (HRI—high refractive index, LRI—low refractive index).

It is thus possible for the reflective layer to be molded as a metal layer made of chromium, aluminum, gold, copper, silver or an alloy of such metals. The metal layer is preferably vapor-deposited in a vacuum in a layer thickness of from 10 nm to 150 nm.

Furthermore, it is also possible for the reflective layer to be formed by a transparent reflective layer, preferably a thin or finely-structured metallic layer or a dielectric HRI or LRI layer. Such a dielectric reflective layer consists, for example, of a vapor-deposited layer made of a metal oxide, metal sulfide, e.g. titanium oxide, ZnS etc. with a thickness of from 10 nm to 150 nm. The reflective layer can also be printed on, for example with a varnish with metallic pigments and/or nanopigments with a high refractive index.

It is further possible for the reflective layer to be molded in areas. It is also possible for the reflective layer to be designed patterned, in particular to represent an item of information. A pattern can, for example, be a graphically designed outline, a figurative representation, an image, a motif, a symbol, a logo, a portrait, an alphanumeric character, a text and the like.

FIG. 3c now shows a microstructure with a binary surface relief 50. The microstructure with the binary surface relief 50 is now molded in such a way that it deflects incident light 35 in, substantially, the same directions 36 as the surface profile 37 described by the function F(x,y) of FIG. 3a. As shown in FIG. 3c, the structure height 53 of the microstructure with the binary surface relief 50 is smaller than the maximum structure height 31 of the spherical profile 30 in FIG. 3a. Further, the structure height 53 of the microstructure with the binary surface relief 50 is smaller than the structure height 43 of the microstructure with the continuous surface relief 40. The structure height 53 in FIG. 3c is 3, wherein the value is the phase difference in radians, as in FIG. 3a and FIG. 3b. The structure height 53 is preferably at least 20 times smaller than the maximum structure height 31 of the spherical profile 30. The structure height 53 of the microstructure with the binary surface relief 50 is preferably substantially constant over the entire surface of the microstructure 44. The width of the grating grooves 52 and/or of the grating bars 51 of the binary surface relief of the microstructure 44 is chosen such that incident light 35 is deflected in the same directions 36 as light which is incident on the surface profile 37 described by the function F(x,y) of FIG. 3a. The binary surface relief 50 has substantially rectangular grating grooves 52 and grating bars 51, with the result that the diffraction of the light in different directions is achieved in that the width of the grating grooves 52 and/or of the grating bars 51 of the binary surface relief is varied accordingly, or the orientation of the diffraction grating is varied.

The microstructures 44 of FIG. 3c as well as multi-step surface reliefs which, as already stated, form through a stepped approximation of a continuous surface relief can be produced using corresponding masks. Furthermore, it is also possible to produce microstructures of this type by means of the so-called and already explained "direct writing" process.

With respect to the design of the layers 45, 46, reference is made here to the above statements.

Figures 4A, 4B, 4C:
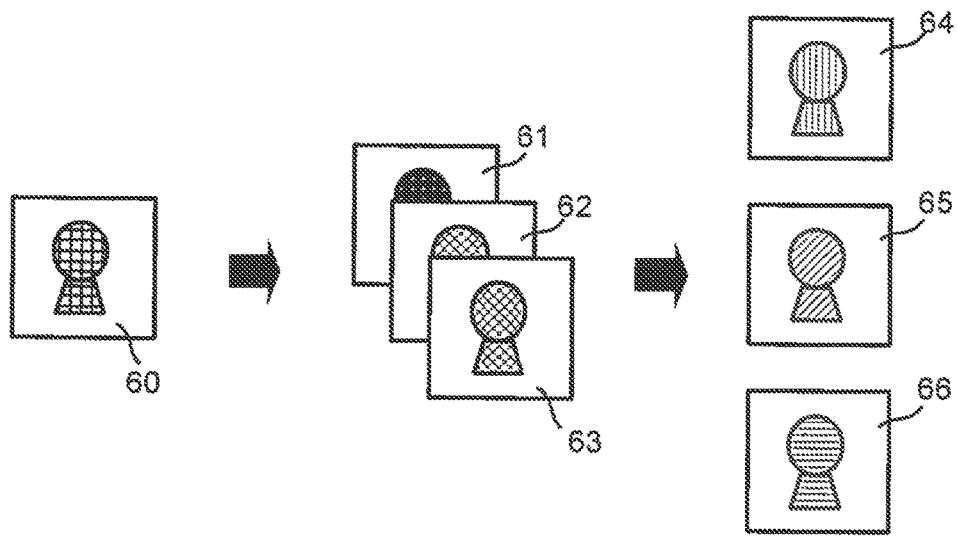
FIG. 4a to FIG. 4c show schematically method steps for producing a security element

FIG. 4a to FIG. 4c show schematic method steps for producing a security element. FIG. 4a shows a multicolored figurative representation 60. Starting from the multicolored figurative representation 60, three color separations 61, 62, 63, as shown in FIG. 4b, of the multicolored figurative representation 60 are generated. Each of the color separations 61, 62, 63 corresponds here to a primary color of a color space, such as for example the RGB color space (R=red; G=green; B=blue) or the CMYK color space (C=cyan; M=magenta; Y=yellow; K=black). In the RGB color space, the colors red, green and blue represent the primary colors. To generate the color separations 61, 62, 63, it is possible, for example, to obtain the figurative representation 60 in a single primary color by suppressing in each case two primary colors. Thus, if, for example, the primary colors red and green are suppressed by means of suitable software, only the primary color blue remains for the multicolored figurative representation 60. The color shade and the brightness of the color separations 61, 62, 63 is calculated in the individual areas of the color separations 61, 62, 63 by means of halftoning techniques, such as for example dot-scanning, line-scanning or diffusion dithering. With color separations 61, 62, 63 of this type, grid masks 64, 65, 66, as shown in FIG. 4c, are now generated. The grid masks 64, 65, 66 here have grid parameters, in particular grid angle and/or grid width, which differ between the grid masks 64, 65, 66 and each correspond to one color of the RBG color space. A photoresist plate is subsequently exposed by means of the grid masks 64, 65, 66 aligned in a registered manner. The exposure is preferably carried out one after the other with the individual grid masks 64, 65, 66. The precisely registered arrangement of the grid masks 64, 65, 66 is decisive for an optimal superimposition of the three primary colors in the security element to be produced. The exposed photoresist plate is subsequently developed in order to obtain the desired resulting surface relief.

It further possible for the exposure of the photoresist plate to be effected by means of a grating exposure or slit exposure using one or more intermediate masters.

An embossing die is preferably produced by means of the developed photoresist plate, and the security element is produced with the aid of the embossing die. For this purpose, a microstructure is embossed into a layer of the security element, preferably a varnish layer such as a replication varnish layer.

The replication varnish layer consists, for example, of a thermoplastic varnish into which a surface relief is molded by means of heat and pressure by the action of an embossing tool. Furthermore, it is also possible for the replication varnish layer to be formed by a UV-crosslinkable varnish and the surface relief to be molded into the replication varnish layer by means of UV replication. The surface relief is molded onto the uncured replication varnish layer by the action of an embossing tool and the replication varnish layer is cured immediately during or after the molding by irradiation with UV light. So-called hybrid varnish systems, which represent a combination of thermoplastic varnish and UV-crosslinkable varnish, are also possible.

The replication varnish layer preferably has a layer thickness between 0.1 µm and 20 µm.

It is further possible for the surface relief to be embossed into one or more zones of the layer of the security element.

The photoresist plate provided for the exposure preferably has a positively acting photoresist, in particular a Shipley Microposit S1800 series photoresist, and a special light-sensitive component. It further possible for the photoresist plate to have a negatively acting photoresist.

The photoresist plate provided for the exposure is preferably produced in that the photoresist is applied to a plate at a temperature of from 15° C. to 30° C. and a relative humidity of from 50% to 90%. The photoresist is preferably applied to a plate by means of spin coating.

The exposure of the photoresist plate is preferably effected with light, the wavelength of which lies between 200 nm and 500 nm.

Figures 5A, 5B, 5C:
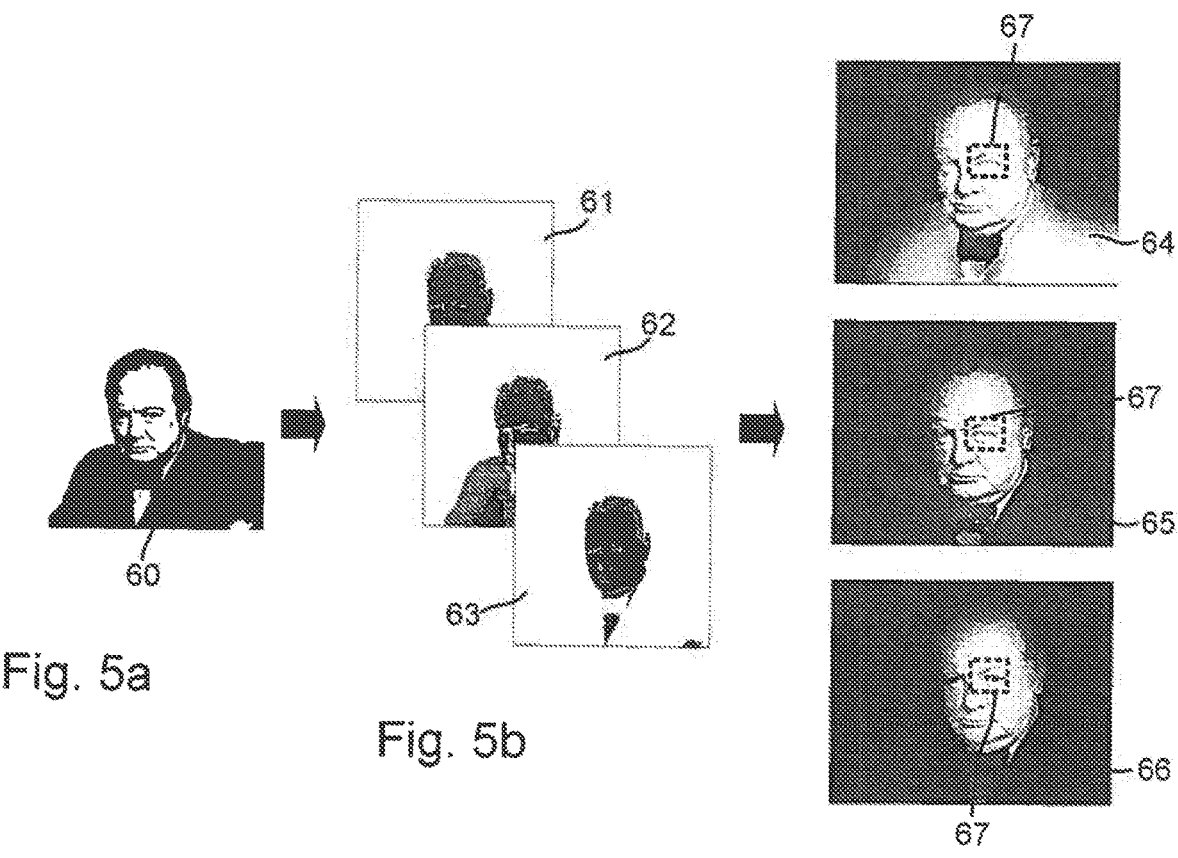
FIG. 5a to FIG. 5c show schematically method steps for producing a security element

FIG. 5a to FIG. 5c show schematically method steps for producing a security element. With respect to the method steps, reference is made here to FIG. 4a to FIG. 4c. The multicolored figurative representation 60 in FIG. 5a is implemented as a portrait. The portrait is an originally black and white photograph which was then made multicolored. Suitable software for multicolored coloring is, for example, AKVIS Coloriage from AKVIS, Perm, Russian Federation. Starting from the subsequently colored figurative representation 60 in the form of the portrait, as already explained within the framework of FIG. 4a to FIG. 4c, the color separations 61, 62, 63 shown in FIG. 5b and the grid masks 64, 65, 66 shown in FIG. 5c are generated.

Figure 6A:
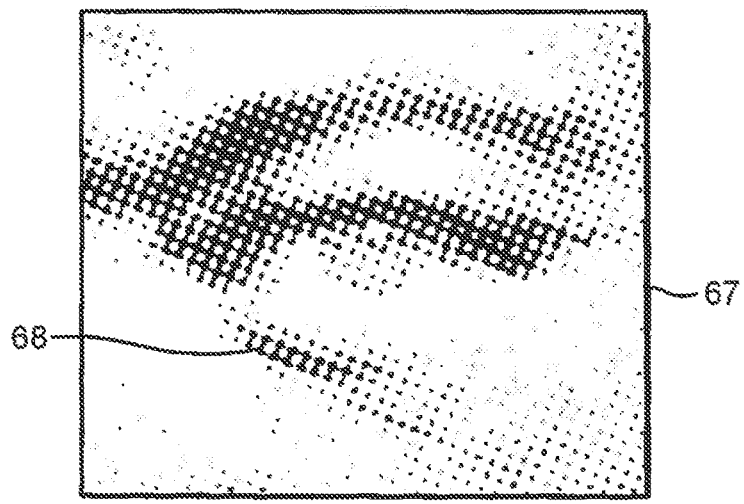
FIG. 6a to FIG. 6c show enlarged details of FIG. 5c FIG. 7a to FIG. 7c show schematic top views of a security element
Figure 6B:
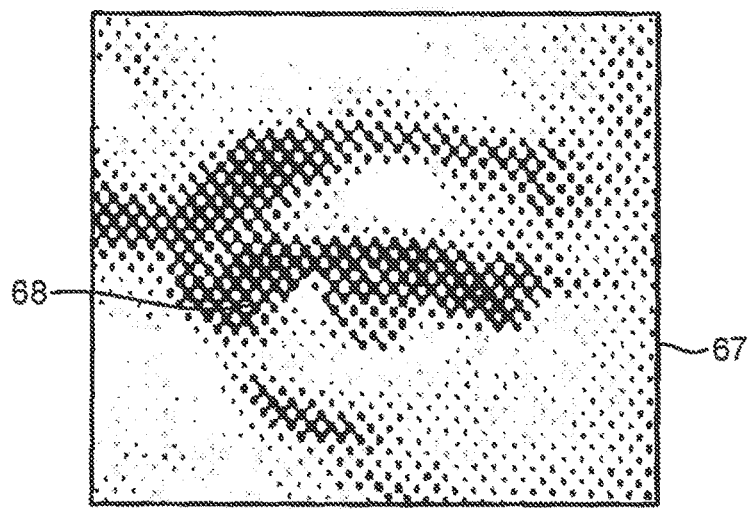
Figure 6C:
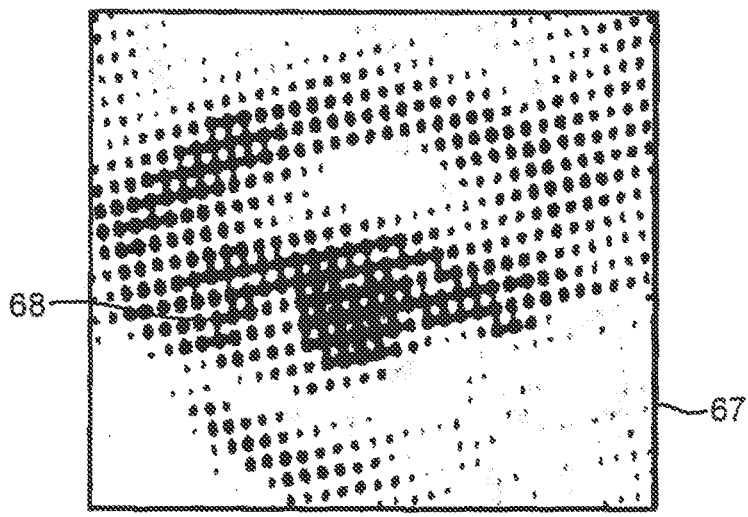

FIG. 6a to FIG. 6c show enlarged details 67 of the grid masks 64, 65, 66 of FIG. 5c. Thus, FIG. 6a shows the enlarged detail 67 of the grid mask 64 in the area of the eye of the portrait. The grid angle of the grid mask 64 as shown in FIG. 6a is 66°. The grid mask 64 corresponds to the primary color blue of the RGB color space. FIG. 6b shows the enlarged detail 67 of the grid mask 65 in the area of the eye of the portrait. The grid angle of the grid mask 65 as shown in FIG. 6b is 42°. The grid mask 65 corresponds to the primary color green of the RGB color space. FIG. 6c further shows the enlarged detail 67 of the grid mask 66 in the area of the eye of the portrait. The grid angle of the grid mask 66 as shown in FIG. 6c is 10°. The grid mask 66 corresponds to the primary color red of the RGB color space. As shown in FIG. 6a to FIG. 6c and already explained, the dot grids 68 of the grid masks 64, 65, 66 differ, for example, in the corresponding grid angles. It is advantageous here to choose the grid parameters, in particular grid angle, grid width and/or resolution, of the grid masks 64, 65, 66 in such a way that an undesired Moiré effect is avoided.

Figure 7A:
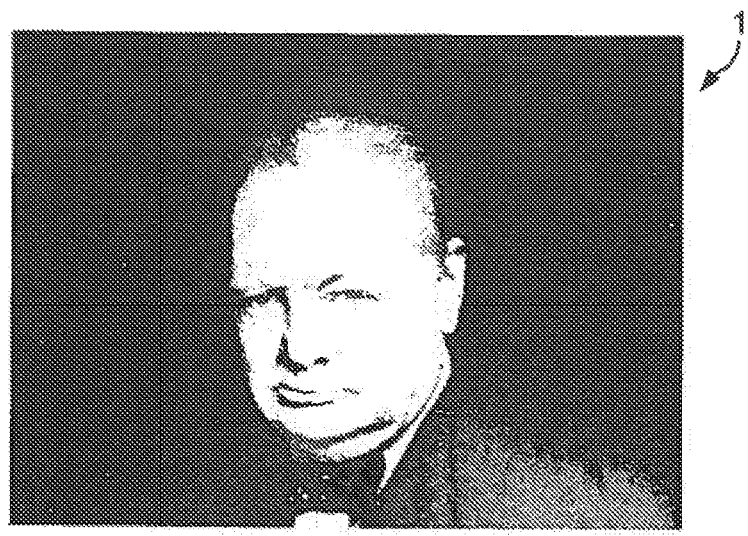
Figure 7B:
Figure 7C:
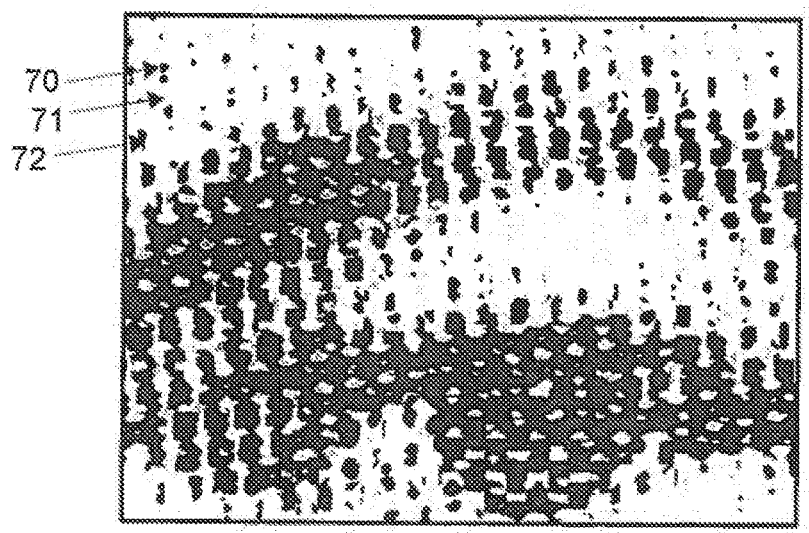

FIG. 7a to FIG. 7c show schematic top views of a security element 1. The security element 1 was produced in a layer of the security element 1 by means of the grid masks 64, 65, 66 and subsequent embossing by means of an embossing die, as already explained. The security element 1 shows, as represented in FIG. 7a, a multicolored portrait which comprises the primary colors red, green and blue. The security element thus appears in true colors to an observer. FIG. 7b shows an enlarged area of the security element 1 of FIG. 7a. As can be seen in FIG. 7b, the security element 1 has a dot rastering which forms through the superimposition of the three exposures of the grid masks 64, 65, 66. FIG. 7c shows a further enlargement of an area of the security element 1 of FIG. 7a. As already explained, the holographic superimposition of the three exposures with the respective dot patterns 70, 71, 72 can be recognized.

Figure 8A:
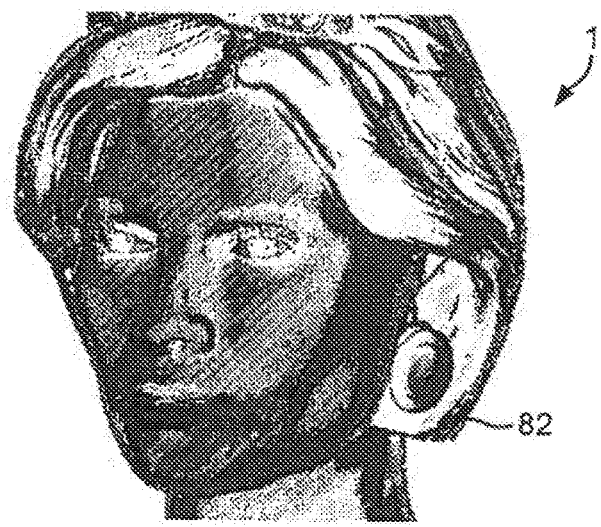
FIG. 8a to FIG. 8c show schematic top views of a security element
Figure 8B:
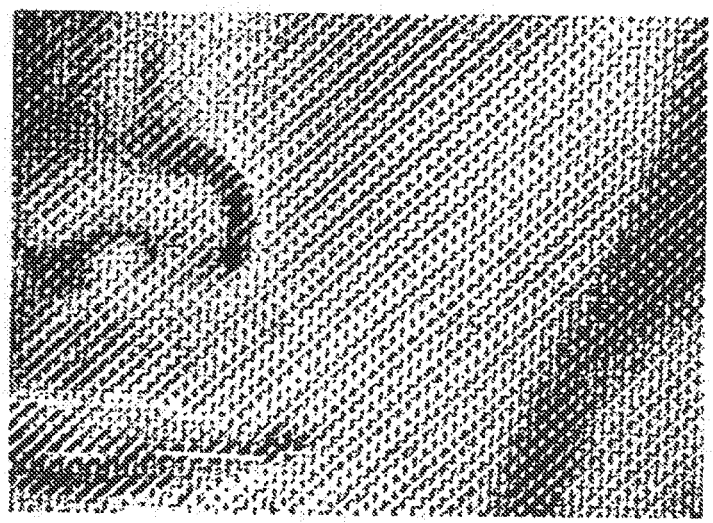
Figure 8C:
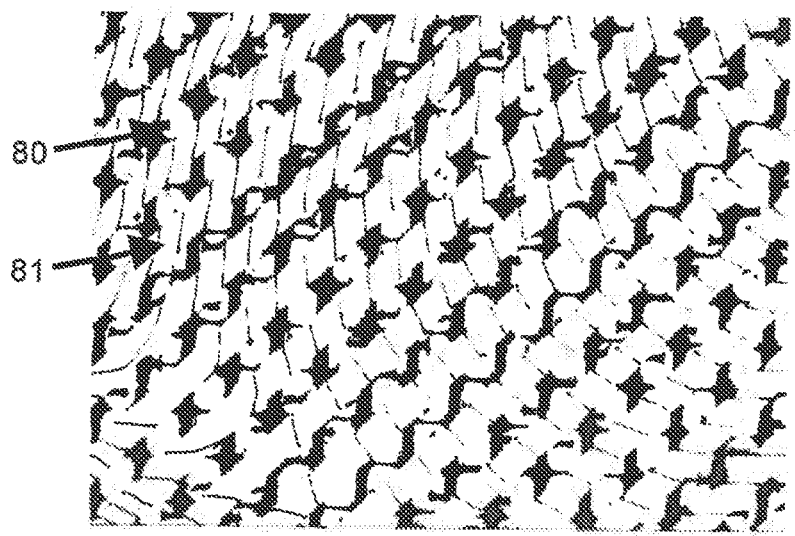

FIG. 8a to FIG. 8c show schematic top views of a security element 1. The security element 1 of FIG. 8a to FIG. 8b has, in the zones 81, a first microstructure, wherein the first microstructure is molded in such a way that the first microstructure provides an observer with a first optical perception which corresponds to a spatial or three-dimensional perception of an object 82. Here, the object 82 is implemented as a portrait. Further, in the zones 80, the security element 1 has a second microstructure, wherein the second microstructure is molded in such a way that the second microstructure provides the observer with a second optical perception which corresponds to a multicolored representation of the object 82, in particular in true colors. The first optical perception and the second optical perception of the object 82 can be perceived by the observer at the same time here. Two diffractive optical effects are thus visible to the observer, wherein the first diffractive optical effect is provided by the first microstructure in the zones 81 and the second diffractive optical effect is provided by the second microstructure in the zones 80.

FIG. 8b shows an enlarged detail of FIG. 8a and FIG. 8c shows a further enlargement of a detail of FIG. 8b.

The first microstructure in the zones 81 of FIG. 8c is here a microstructure which was produced according to the method that is described in FIGS. 2a to 2f. The zones 81, which have the first microstructure, are arranged according to a line grid with a line width of 40 µm and a grid width of 80 µm. The first microstructure in the zones 81 thus produces a spatial or three-dimensional impression of the object 82 for the observer. The first microstructure in the zones 81 is introduced into a layer of the security element 1 for example by means of the "direct writing" process explained above.

The second microstructure in the zones 80 is here a microstructure which corresponds to the microstructures according to FIG. 4 to FIG. 7. The zones 80, which have the second microstructure, are arranged according to a line grid with a line width of 40 µm and a grid width of 80 µm. The second microstructure in the zones 80 thus produces a multicolored representation of the object 82 for the observer, in particular in true colors. The second microstructure in the zones 80 is embossed into a layer of the security element 1 for example by means of a correspondingly molded embossing die.

The zones 80 and 81 are gridded into each other by means of so-called interlacing (line width 40 μm, grid width 80 μm), i.e. in each case one zone 80 and one zone 81 are adjacent to each other and in each case alternating. Through the interlacing of the two high-resolution zones 80, 81, the grid width of which is in each case below the resolution capacity of the naked human eye, the optical effects of both zones 80, 81 can be accordingly perceived at the same time and combined, with the result that, in combination, a spatial and three-dimensional impression in true colors of the portrait which can be seen in FIG. 8*a* can be provided. This combination is so closely approximated to the natural impression of a real sculptural reproduction that a human observer can perceive the optical effect as very realistic.

The surface coverage of the zones 81, which have the first microstructure, on the total surface area consisting of the zones 80 and 81, which form the object 82, is 50% in FIG. 8*a* to FIG. 8*c*. However, it is also possible for the proportion of the zones 81 in the total surface area consisting of the zones 80 and 81 to be between 10% and 90%. The proportion of the zones 80 in the total surface area consisting of the zones 80 and 81 is then correspondingly between 90% and 10%.

It is further possible for the grid width to be varied, in particular within a predefined variation range.

Figure 9:
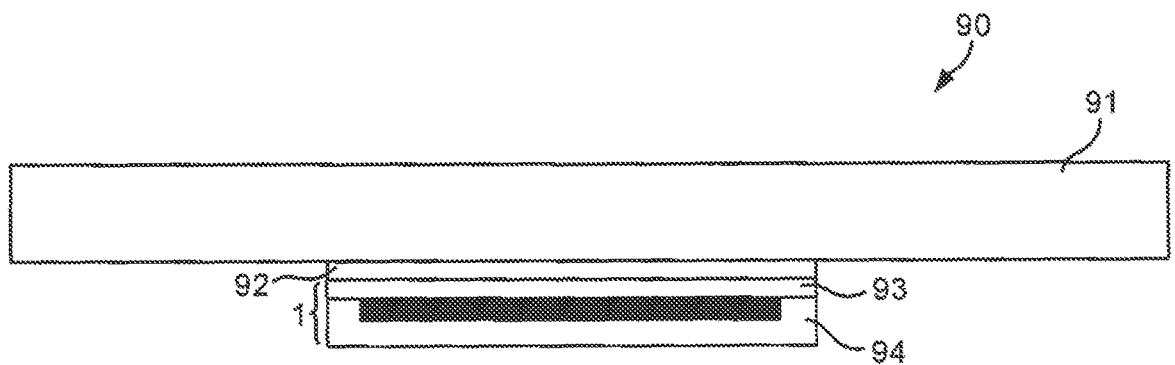
FIG. 9 shows a schematic sectional representation of a transfer film

FIG. 9 shows a transfer film 90. It has proved successful if the security element 1 is provided on a transfer film 90, with the result that the security element 1 can be applied to a security document 2 by means of embossing. Such a transfer film 90 has at least one security element 1 according to the invention, wherein the at least one security element 1 is arranged on a carrier film 91 of the transfer film 90 and can be detached therefrom.

Starting from the carrier film 91 of the transfer film 3, a detachment layer 92 is usually present here, in order to be able to detach the security element 1 from the carrier film 91 after embossing. The optional transparent protective layer 93 formed as a protective varnish layer and, furthermore, the remaining layers of the security element 1 are preferably present on a side of the detachment layer 92 facing away from the carrier film 91.

It is likewise possible for the security element 1 to be applied in the form of a laminating film, wherein the carrier film 91 remains on the security element 1 and also no detachment layer 92 is provided between the carrier film 91 and the security element 1.

The security element 1 can further have an adhesive layer 94, in particular made of a cold or hot-melt adhesive.

LIST OF REFERENCE NUMBERS

1 security element
2 security document
3 geometric figure
4 security thread
5 observer
6, 7, 8 co-ordinate axes x, y, z
20 two-dimensional image
21 three-dimensional object
22 observer
23 optical perception
30 spherical profile
31, 43, 53 structure height
32 reference surface
35 incident light
36 directions
37 surface profile
34, 35 material layers
40 microstructure with continuous surface relief
41, 42 sides
44 microstructure
45, 46 layers
40 microstructure with binary surface relief
51 grating bars
52 grating grooves
60 figurative representation
61, 62, 63 color separation
64, 65, 66 grid mask
67 detail
68 dot grid
80, 81 zones
82 object
90 transfer film
91 carrier film
92 detachment layer
93 protective layer
94 adhesive layer

The invention claimed is:

1. A method for producing a security element comprising:
   a) recording a three-dimensional object;
   b) determining a surface profile of the three-dimensional object, described by a function $F(x,y)$, wherein the function $F(x,y)$ describes the distance between the surface profile and a two-dimensional reference surface spanned by co-ordinate axes x and y at the co-ordinate points x and y;
   c) determining a first microstructure in such a way that the structure height of the first microstructure is limited to a predetermined value smaller than the maximum distance between the surface profile and the two-dimensional reference surface, and that the first microstructure provides an observer with a first optical perception which corresponds to the surface profile of the three-dimensional object described by the function $F(x,y)$; and
   d) introducing the first microstructure into a layer of the security element by means of lithographic methods, in such a way that the first microstructure of the layer of the security element provides the observer with the first optical perception.

2. The method according to claim 1, wherein the step a) of recording the three-dimensional object comprises the generation of a virtual three-dimensional object and/or the recording of a real three-dimensional object by means of a contact profilometer and/or a laser scanner.

3. The method according to claim 2, wherein the spatial resolution of the recording device corresponds to at least 1.5 times, the smallest structure to be represented of the surface profile of the three-dimensional object described by the function $F(x,y)$.

4. The method according to claim 1, wherein a microstructure with a binary surface relief, a multi-step surface relief and/or a continuous surface relief is determined as first microstructure in step c).

5. The method according to claim 1, wherein the structure height of the first microstructure is chosen substantially constant over the entire surface of the first microstructure for the formation of a binary surface relief and wherein the widths of the grating grooves and/or of the grating bars of the binary surface relief of the first microstructure are chosen such that the observer is provided with the first optical perception.

6. The method according to claim 1, wherein for the formation of a continuous surface relief, the first microstructure is designed in such a way that one side in each case of the grating grooves of the continuous surface relief of the first microstructure run parallel to each other and substantially parallel to the one perpendicular to the two-dimensional reference surface, wherein, that the other sides in each case of the grating grooves run parallel to the surface profile (37) of the three-dimensional object described by the function F(x,y) at least in areas and/or wherein, for the formation of the continuous surface relief of the first microstructure, the first microstructure is designed in such a way that the first microstructure is equal to the result of the surface profile described by the function F(x,y) modulo the predetermined value of the structure height of the first microstructure.

7. The method according to claim 6, wherein the other sides in each case of the grating grooves running parallel to the surface profile of the three-dimensional object described by the function F(x,y) at least in areas are approximated in steps in such a way that the height of the stepped approximations is constant between predetermined co-ordinate points x and y of the two-dimensional reference surface and corresponds to the value at the respective co-ordinate points x and y of the first microstructure with the continuous surface relief.

8. The method according to claim 1, wherein in step d), the introduction of the first microstructure into the layer of the security element is effected by means of electron beam lithography and/or photolithography.

9. A security element for marking a security document wherein a layer of the security element comprises a first microstructure, wherein the first microstructure is molded in such a way that the structure height of the first microstructure is limited to a predetermined value smaller than the maximum distance between a surface profile of a three-dimensional object described by a function F(x,y) and a two-dimensional reference surface spanned by co-ordinate axes x and y, wherein the function F(x,y) describes the distance between the surface profile and the two-dimensional reference surface at the co-ordinate points x and y, and wherein the first microstructure provides an observer with a first optical perception which corresponds to the surface profile of the three-dimensional object described by the function F(x,y).

* * * * *